(12) United States Patent
McEwan

(10) Patent No.: US 6,535,161 B1
(45) Date of Patent: Mar. 18, 2003

(54) LOOP POWERED RADAR RANGEFINDER

(75) Inventor: Thomas E. McEwan, Carmel Highlands, CA (US)

(73) Assignee: McEwan Technologies, LLC, Las Vegas, NV (US)

( * ) Notice: Subject to any disclaimer, the term of this patent is extended or adjusted under 35 U.S.C. 154(b) by 0 days.

(21) Appl. No.: 09/723,952

(22) Filed: Nov. 28, 2000

(51) Int. Cl.[7] .............................................. G01S 13/08
(52) U.S. Cl. ........................ 342/124; 342/118; 342/134
(58) Field of Search ......................... 342/124, 118–146

(56) References Cited

U.S. PATENT DOCUMENTS

| | | | |
|---|---|---|---|
| 3,940,768 A | 2/1976 | Olsen et al. | 343/18 E |
| 4,016,763 A | 4/1977 | Grindheim | 73/362 AR |
| 4,131,889 A | 12/1978 | Gray | 343/8 |
| 4,194,200 A | 3/1980 | Goldie | 343/5 SM |
| 4,228,435 A | 10/1980 | Nevin | 343/5 SM |
| 4,242,665 A | 12/1980 | Mate | 340/870.38 |
| 4,415,897 A | 11/1983 | Kennedy | 343/5 SM |
| 4,847,623 A | 7/1989 | Jean et al. | 342/124 |
| 5,207,101 A | 5/1993 | Haynes | 73/597 |
| 5,345,471 A | 9/1994 | McEwan | 375/1 |
| 5,376,938 A | * 12/1994 | Martinez et al. | 342/124 |
| 5,465,094 A | 11/1995 | McEwan | 342/28 |
| 5,521,600 A | 5/1996 | McEwan | 342/27 |
| 5,546,088 A | * 8/1996 | Trummer et al. | 342/124 |
| 5,609,059 A | 3/1997 | McEwan | 73/290 R |
| 5,610,611 A | * 3/1997 | McEwan | 342/89 |
| 5,672,975 A | 9/1997 | Kielb et al. | 324/644 |
| 5,682,164 A | 10/1997 | McEwan | 342/27 |
| 5,757,320 A | 5/1998 | McEwan | 342/387 |
| 5,774,091 A | 6/1998 | McEwan | 342/387 |
| 5,805,110 A | 9/1998 | McEwan | 342/387 |
| 5,872,537 A | * 2/1999 | Siweris | 342/128 |
| 5,923,284 A | * 7/1999 | Artis et al. | 342/129 |

(List continued on next page.)

FOREIGN PATENT DOCUMENTS

WO    WO 00/45460    8/2000

OTHER PUBLICATIONS

Laverghetta "Modern Microwave Measurements and Techniques" pp. 171–173.

Lang et al. "Smart Transmitter Using Microwave Pulses to Measure the Level of Liquids and Solids In Process Applications" ISA, 1993—Paper #93–319.

Owada et al. "A Two–Wire Ultrasonic Level Meter With Piezoelectric Polymer–Film Sensor" ISA, 1988—#88–1553.

*Primary Examiner*—Thomas H. Tarcza
*Assistant Examiner*—Brian Andrea
(74) *Attorney, Agent, or Firm*—Weide & Miller, Ltd.

(57) ABSTRACT

A pulse-echo radar measures non-contact range while powered from a two-wire process control loop. A key improvement over prior loop-powered pulse-echo radar is the use of carrier-based emissions rather than carrier-free ultrawideband impulses, which are prohibited by FCC regulations. The radar is based on a swept range-gate homodyne transceiver having a single RF transistor and a single antenna separated from the radar transceiver by a transmission line. The transmission line offers operational flexibility while imparting a reflection, or timing fiducial, at the antenna plane. Time-of-flight measurements are based on the time difference between a reflected fiducial pulse and an echo pulse, thereby eliminating accuracy-degrading propagation delays in the transmitters and receivers of prior radars. The loop-powered rangefinder further incorporates a current regulator for improved signaling accuracy, a simplified sensitivity-time-control (STC) based on a variable transconductance element, and a jam detector. Applications include industrial tank level measurement and control, vehicular control, and robotics.

15 Claims, 5 Drawing Sheets

U.S. PATENT DOCUMENTS

| | | | |
|---|---|---|---|
| 5,986,600 A | 11/1999 | McEwan | 342/28 |
| 6,014,100 A | 1/2000 | Fehrenbach et al. | 342/124 |
| 6,031,421 A | 2/2000 | McEwan | 330/10 |
| 6,052,080 A * | 4/2000 | Magori | 342/118 |
| 6,055,287 A | 4/2000 | McEwan | 375/376 |
| 6,060,915 A | 5/2000 | McEwan | 327/94 |
| 6,072,427 A | 6/2000 | McEwan | 342/175 |
| 6,107,957 A * | 8/2000 | Cramer et al. | 342/124 |
| 6,137,438 A | 10/2000 | McEwan | 342/134 |
| 6,198,424 B1 * | 3/2001 | Diede et al. | 342/22 |
| 6,295,018 B1 * | 9/2001 | Diede et al. | 342/124 |
| 6,320,532 B1 * | 11/2001 | Diede | 342/124 |

\* cited by examiner

LOOP POWERED RADAR RANGEFINDER

BACKGROUND OF THE INVENTION

1. Field of the Invention

The present invention relates to rangefinders, and more particularly to pulse-echo radar rangefinders that are powered by an industrial two-wire current signaling loop.

2. Description of Related Art

Control instrumentation for industrial processes traditionally use a two-wire or a four-wire interface between a sensor (called a "transmitter") and a controller or data processor. The four-wire arrangement uses two wires for power, and two other wires for signaling using a current-loop format. Carrier-based digital modulation may also be impressed on the two-wire current loop, such as the HART® Protocol, for communication and control.

The two-wire interface uses only two wires for both conveying power to the transmitter and conveying proportional analog data from the transmitter. The proportional analog signal most often conforms to a 4–20 mA standard that specifies 4 mA to power the transmitter and 0–16 mA to indicate an analog value. The two-wire loop is preferred due to its lower cost, its lower explosion hazard and a large installed base of two-wire links at industrial sites. However, two-wire operation poses severe power constraints on the transmitter: a few tens of milliwatts.

Loop-powered transmitters date back to at least 1977. For example, U.S. Pat. No. 4,016,763 to Grindheim, 1977, discloses a resistance bridge in a loop-powered circuit. U.S. Pat. No. 4,242,665 to Mate, 1980, discloses a two-wire circuit that achieves low average power using a high power sensor operated with duty-cycled power. An ultrasonic rangefinder operating on loop power was presented in "A Two-Wire Ultrasonic Level Meter with Piezoelectric Polymer-Film Sensor" by Owada et al, Proceedings of the ISA/88 International Conference and Exhibit, Vol. 43, Part 3, 1988. Thus, by 1988 the details of loop-powered pulse-echo ultrasonic rangefinders were published. However, pioneering work on loop-powered pulse-echo radar rangefinders did not commence until the 1990's.

A motion sensor using a high power radar that achieves low average power by using duty-cycled power was disclosed in U.S. Pat. No. 4,131,889 to Gray, 1978. While Gray did not power his radar from an industrial loop, it would have been evident to do so by 1978 in view of Grindheim and 1980 in view of Mate. Nonetheless, the resulting loop-powered radar based on the Gray patent would not be capable of measuring range, or more particularly, tank levels since Gray's radar only detected motion.

FIG. 1a schematically depicts the first known low power radar to operate on a two-wire loop. It was prototyped in 1993 and disclosed in U.S. Pat. No. 5,465,094 to McEwan, 1995. Although the loop was scaled for automotive use and signaled a discrete current level, it would have been apparent to a practitioner in 1993 to adapt it to the 4–20 mA industrial standard. In operation, a low current is received over two wires 20 and stored in a power store element 14 such as a capacitor, which provides power to voltage regulator 12, which powers radar 10. A low power radar 10 (also known as micropower impulse radar, or MIR) detects motion and responsively operates a shorting switch 16 to increase the current on the 2-wire interface 20. During the time switch 16 is closed, the voltage on wire pair 20 drops to zero, so radar 10 operates on stored power from power store element 14.

In early 1994 a low power MIR impulse radar rangefinder was prototyped, forming the basis for U.S. Pat. Nos. 5,774,091; 5,757,320; and 5,805,110, all to McEwan, 1998. While not specifically set up for loop operation, a practitioner could readily have adapted the impulse radar for 4-20 mA two-wire loop operation in early 1994.

FIG. 1b schematically depicts a loop-powered impulse radar rangefinder as disclosed in U.S. Pat. No. 5,672,975 to Kielb et al, 1997, assigned to Rosemount, Inc. A two-wire interface 20 provides power to voltage regulator 12, which in turn powers impulse radar 11. A measurement circuit 22 initiates transmissions and starts a range measurement timer. Impulse radar 11 ends the range measurement upon receipt of an echo. The measurement circuit 22 provides an output to a 0–16 mA proportional analog current source 18 to signal the measured range across two-wire loop 20. The entire apparatus must draw 4 mA from two-wire loop 20 so the total current spans 4–20 mA.

FIG. 1c schematically depicts a loop-powered impulse radar rangefinder disclosed in U.S. Pat. No. 6,014,100 to Fehrenbach et al, 2000, assigned to Vega Grieshaber, AG. A high power radar 13 is operated with duty-cycled power to achieve low average power. Power store element 14 provides high current surges to high power radar 13 and averages the high power surges with inactive periods drawing little or no power so the current draw from regulator 12 is low. This duty-cycled power technique appears to be similar to that described by the Gray '889 patent in 1978. The advantage to using a high power radar design is that the analog circuitry can operate with lower impedances for better moisture immunity and stability, lower cost, and less complexity. Further, high frequency transistors require about 10 mA bias current, which alone could exceed the available power. Aside from duty-cycled power, high power radar 13 appears to be similar in operation to low power radar 11, as stated by Fehrenbach et al, "signal generation and processing during and after measurements are as described, for instance, in U.S. Pat. No. 5,672,975." Having provided no other technical details on radar 13, it can only be assumed that it is an impulse radar having similar timing to that of impulse radar 11.

The prior loop-powered rangefinding radars, as depicted in FIGS. 1b and 1c, are impulse radars. Step generator 76 in FIG. 2 of the '975 patent indicates its impulse nature. The output of step generator 76 is differentiated into an impulse by antenna 18—all antennas, including antenna 18 in the '975 patent, differentiate a step input into a radiated impulse. Microwave circulators, such as circulator 78 in the '975 patent, pass an ultrawideband spectrum and offer essentially no bandlimiting action, so antenna 18 defines the emission spectrum. Thus, radars 11, 13 are damped wave devices, and most likely radiate over a broad spectral region, such as 1–5 GHz, or with a resonant horn antenna, perhaps 4–8 GHz. Radars 11, 13 pose a serious regulatory limitation: damped wave emitters have been prohibited in the U.S. and internationally since 1934. An impulse radar spectrum crosses numerous restricted bands, particularly those used by GPS equipment and aviation safety radar. Impulse radars 11, 13 cannot receive FCC equipment authorization under current regulations and therefore have little or no commercial value.

The FCC strictly prohibits intentional radiation in the restricted bands, no matter how weak. Accordingly, adding a filter to the output of an impulse radar to limit spectral radiation in the restricted bands may be viewed in the same light as adding an attenuator to the output—it does not change the intent of the emissions. Similarly, operating an impulse radar in a tank may be viewed as adding an attenuator to the output of a radar having intentional radiation in the restricted bands.

FCC prohibitions notwithstanding, the impulse radar described in the '975 patent (and by incorporation, the '100 patent) appears to have at least four deficiencies which would block practical implementation. First, the '975 specification cites the receive clock frequency $f_2=f_1+\Delta f$, where $f_1$ is the transmit clock and $f_2$ is the receive clock, $\Delta f$ being a 10–40 Hz offset. As is well known in this type of slipped-phase clock system, the frequency relation should be $f_2=f_1-\Delta f$. The effect of this error is to make the sampled equivalent time output of receiver 70 appear to run backwards, so an echo appears before a pulse is transmitted. There is no suggestion of how to measure or process time-reversed signals.

Second, the '975 specification states ". . . the receive and transmit circuits in circuitry 70 are electrically isolated from each other. This is important so that transmit pulses are not incorrectly detected by the receiver as the echo pulse." A practitioner would know that the transmit-receive isolation provided by a realizable circulator is on the order of 20-30 dB. Since practical echo signals are 40–120 dB weaker than the transmit pulse, the transmit pulse will always be much stronger than any echo pulse and therefore the transmit pulses will always be "incorrectly detected" as echo pulses. Accordingly, the radar described in the '975 patent will always register zero range.

Third, a critical element is missing in radar 70 of the '975 patent. It is stated that the "measurement circuitry initiates the transmitting of the microwave signal and determines product height based upon the reflected signal received by the receiver." The missing element is a phase detector or other means to synchronize the initiation of timing measurements. Range timing measurements must begin when clock 1 and clock 2 are in phase coincidence (the transmit time) and continue until clock 2 slips in phase to align with an echo pulse (the receive time). While the echo pulse phase alignment is provided by pulse detection in the receiver, there is no transmit phase alignment detector, thereby rendering any transmit-to-receive time measurement meaningless.

Fourth, the '975 patent provides no details on its impulse receiver, which must have ultra-wide bandwidth while consuming very little power. There are several references to MIR, including a low power MIR receiver, U.S. Pat. No. 5,345,471 to McEwan. The MIR receiver receives impulses and outputs an integrated signal. It is not a "pulses-in, pulses-out" receiver, as was clearly established by a reexamination (certificate B1 U.S. Pat. No. 5,361,070). The '975 patent states "the output of impulse receiver 80 is a series of impulses." Pulse-by-pulse operation is further indicated by analog to digital converter 82 "since a sample must be taken after every transmit pulse . . . " A low power pulse-by-pulse receiver is not disclosed in the specification or the references. There is no known low power "pulse-by-pulse" ultrawideband receiver that could be used in the '975 patent, and the '975 patent does not disclose any details thereof.

Assuming inventive fixes could be added to the '975 patent to overcome these four deficiencies, the resulting system would have serious timing inaccuracies since the transmit-to-receive time measurement includes not only the desired echo delay time, but also the propagation delays through the entire transmitter and receiver. Commercial tank level radars require stability on the order of 1 cm or 66 ps or better. The delay variation in even one logic gate or transistor can exceed 66 ps, not to mention an entire transmitter and receiver. Means to address commercial accuracy requirements are not disclosed in the '975 patent.

Precision analog signaling over a 4–20 mA loop involves maintaining the transmitter power supply current at exactly 4 mA and then adding 0–16 mA for the analog signal. The prior art radars of FIGS. 1b and 1c do not disclose a means to precisely regulate the 4 mA transmitter power. They appear to rely on the transmitter itself to somehow draw exactly 4 mA. Presumably, a load trimmer could be adjusted to obtain exactly 4 mA power draw. Overall accuracy would then be limited by drift in transmitter current, perhaps+/−0.2 mA, which would degrade the 0–6 mA signaling accuracy to about 1% of full scale.

A radar rangefinder employing FCC-compatible pulsed RF emissions with two antennas is described in U.S. Pat. No. 6,137,438, "Precision Short-Range Pulse-Echo Systems with Automatic Pulse Detectors," to McEwan, 2000. The '504 patent does not suggest loop powered operation, although it could be suitably configured by a practitioner. Operation with a single antenna (rather than separate transmit and receive antennas) allows operation through a smaller tank opening—a competitive and cost saving feature. A single antenna pulse-echo radar employing harmonic techniques is disclosed in U.S. patent application Ser. No. 09/416,835, Homodyne Swept-Range Radar," to McEwan. This application does not suggest loop-powered operation, although a practitioner could configure the apparatus for loop-powered operation. Fundamental-mode receiver operation, or operation with a single antenna connected via a cable is not discussed.

In summary, the prior art does not suggest a loop-powered, pulse-echo radar range finder that (1) is FCC compliant (i.e., non-impulse), (2) has a 4 mA (or other current) regulator, and (3) employs an accurate, externally referenced measurement system using a single antenna without a microwave circulator.

SUMMARY OF THE INVENTION

The present invention is a short-range radar transceiver that uses the same pulsed-RF oscillator for both a transmit oscillator and a swept-in-time receive local oscillator. The dual function use of one oscillator eliminates the need for two microwave oscillators and facilitates operation with only one antenna for both transmit and receive functions. Further, it assures optimal operation since there are no longer two oscillators that can go out of tune with each other (in a similar radar having two RF oscillators, both oscillators must be tuned to the same frequency). U.S. patent application Ser. No. 09/416,835, Homodyne Swept-Range Radar," to McEwan describes a homodyne radar using a single harmonic oscillator and a receive harmonic sampler. The present invention employs a non-harmonic fundamental frequency transmit oscillator and non-harmonic fundamental frequency receive sampler. Unlike the harmonic radar of the '835 Application, the present invention employs a fundamental frequency homodyne system that avoids the problem of injection locking on strong echo pulses (an effect described in the '835 Application) by operating at lower microwave frequencies where the pulsed RF oscillator can be strongly injection-locked to its drive pulses, and by loosely coupling the RF oscillator to the antenna through a transmission line or waveguide.

A key departure from the homodyne radar of application Ser. No. 09/416,835 is the use of a coaxial cable (or waveguide) to connect to the antenna. This arrangement produces a reflection at the coax/antenna interface that is used as a measurement reference plane. This differs from prior art pulse-echo radars that either (1) use the transmit main bang as a measurement reference (e.g., U.S. Pat. No. 6,137,438), or (2) employ a circulator in a poor effort to limit the main bang coupling into the receiver for the purpose of preventing false receiver triggering (e.g., U.S. Pat. No. 5,672,975). In contrast, the present invention generally uses a time window to exclude the main bang coupling from the receiver output.

The reflection from the antenna forms a timing fiducial pulse and thus a measurement reference plane. The time between the fiducial reflection and a target echo defines the distance between the antenna reference plane and a target, e.g., a material level in a tank. The fiducial scheme improves the measurement accuracy while being an advantageous physical arrangement since the antenna is usually separated from the electronics package. That is, the antenna is inside the tank and the radar electronics are outside the tank, so a transmission line or waveguide must connect them. A fiducial reference scheme has been used with FMCW radars, as seen in U.S. Pat. No. 4,847,623, "Radar Tank Gauge'" , to Jean et al, 1989, and in TDR systems such as U.S. Pat. No. 5,609,059 "Electronic Multi-Purpose Material Level Sensor," to McEwan, 1997. However, there is no prior suggestion of how to implement the fiducial scheme with a pulsed-RF pulse-echo radar.

A shunt current regulator is provided to regulate the total current drawn by the apparatus to precisely 4.00 mA (in a 4–20 mA loop for example) regardless of how much current is drawn by the radar (but always less than 4 mA). The current regulator improves the combined accuracy of the 0–16 mA signal current added to the 4.00 mA and it effectively limits drift with time and temperature.

A new sensitivity time control (STC) is provided that is simpler than the digital STC described in U.S. Pat. No. 6,031,421, "Controlled Gain Amplifier" to McEwan, 2000, or the FET-based STC disclosed in U.S. Pat. No. 5,805,110, "Impulse Radar With Swept-Range Gate," to McEwan, 1998. The new STC employs a current-controlled silicon bipolar transconductance element that increases receiver gain proportionally to the radar gate range.

The emission spectrum from a short-pulse RF oscillator is very broad (often greater than 1 GHz) and appears very low in amplitude on a spectrum analyzer of limited bandwidth, e.g., 1 MHz bandwidth, as preferred in FCC tests. Consequently, narrowband, RF marker pulses are interleaved with the short, coherent RF ranging pulses to produce a highly visible spectrum with an identifiable peak, i.e., carrier frequency. However, the marker pulses may create spurious echoes. To avert this possibility, the marker pulses are randomized in phase so their echoes average to zero in the receiver. Alternatively, the marker pulse transmissions can be time-locked to the range gate to produce a zero beat receiver output that is easily rejected with a simple highpass filter. In either case, the marker pulses produce no receiver output when there is no jamming. When there is jamming, the marker pulses mix with the jamming to produce a detectable output from the receiver, causing jam detection circuitry to output an alarm or control signal.

The present invention is a precision radar rangefinder that can be used in radars for many applications, e.g., tank level measurement, including 0.01% accurate custody transfer measurement; industrial and robotic controls; vehicle backup warning and collision-detection radars; and general rangefinding applications. Since the present invention is phase coherent, microwave holograms can be formed using techniques known in the art, where the customary holographic reference beam is conveniently replaced by the internal phase coherent timing of the present invention. In addition to these features the total power consumption is about 10 mW, sufficiently low for 4–20 mA loop-powered applications.

A primary object of the present invention is to provide a precision, low cost, FCC compatible pulse echo radar ranging system having a single antenna.

A further object of the present invention is to provide a high accuracy fiducial reference with a physical embodiment suited to the needs of tank level measurement.

Yet another object of the present invention is to provide a wideband radar ranging system with a measurable center frequency and jam detection.

Still another object of the present invention is to provide a radar having a single transmit/receive oscillator and simplified STC for low cost applications.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. patents and copending U.S. applications cited herein are herein incorporated by reference.

Figure 1A:
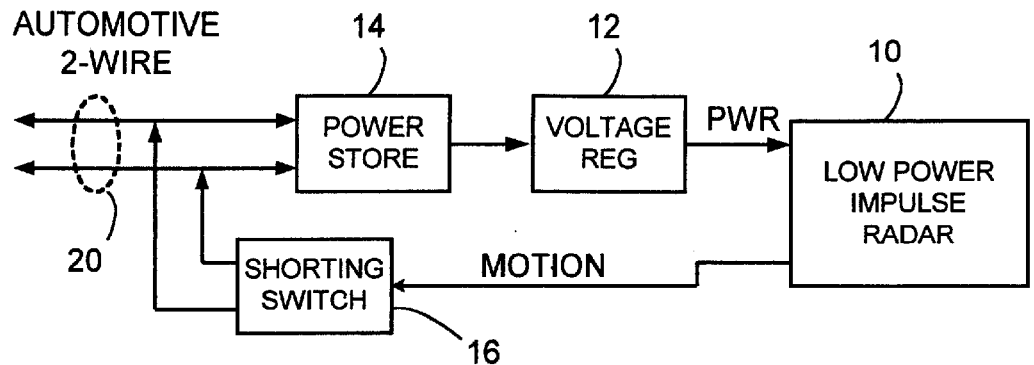
FIG. 1a is a block diagram of a loop-powered impulse radar for automotive applications (prior art).
Figure 1B:
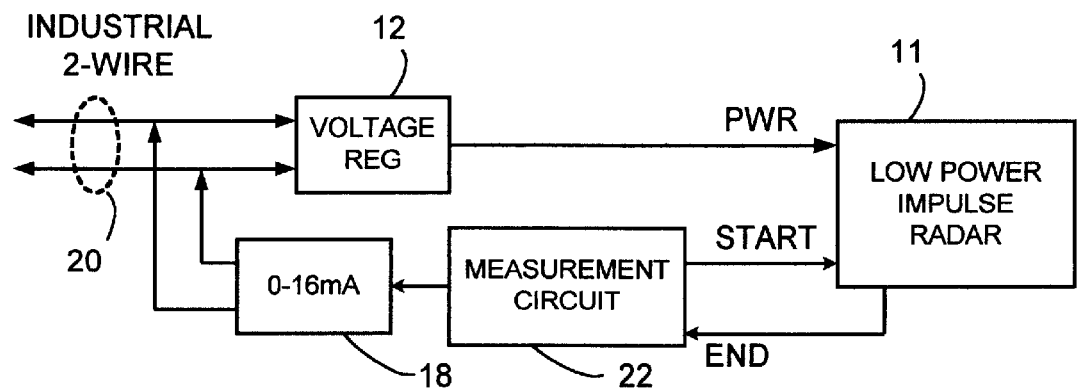
FIG. 1b is a block diagram of a loop-powered impulse radar for industrial applications (prior art).
Figure 1C:
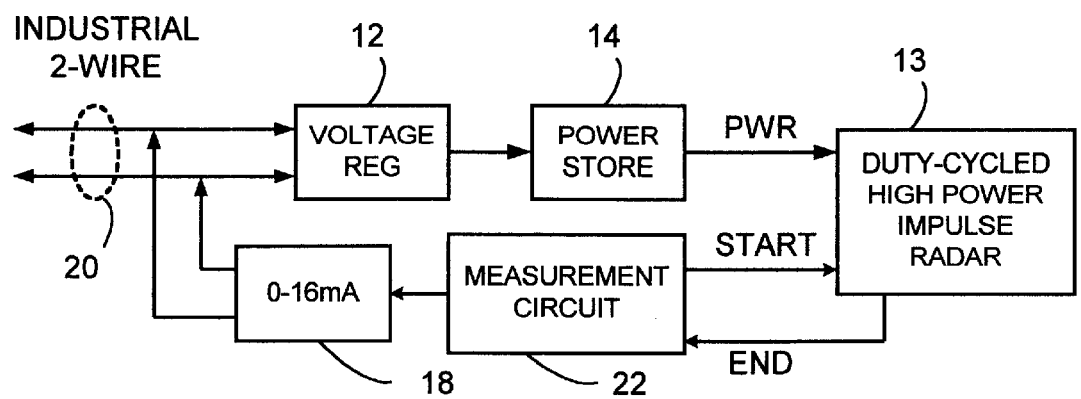
FIG. 1c is a block diagram of a loop-powered high-power low duty-cycle impulse radar for industrial applications (prior art).
Figure 2:
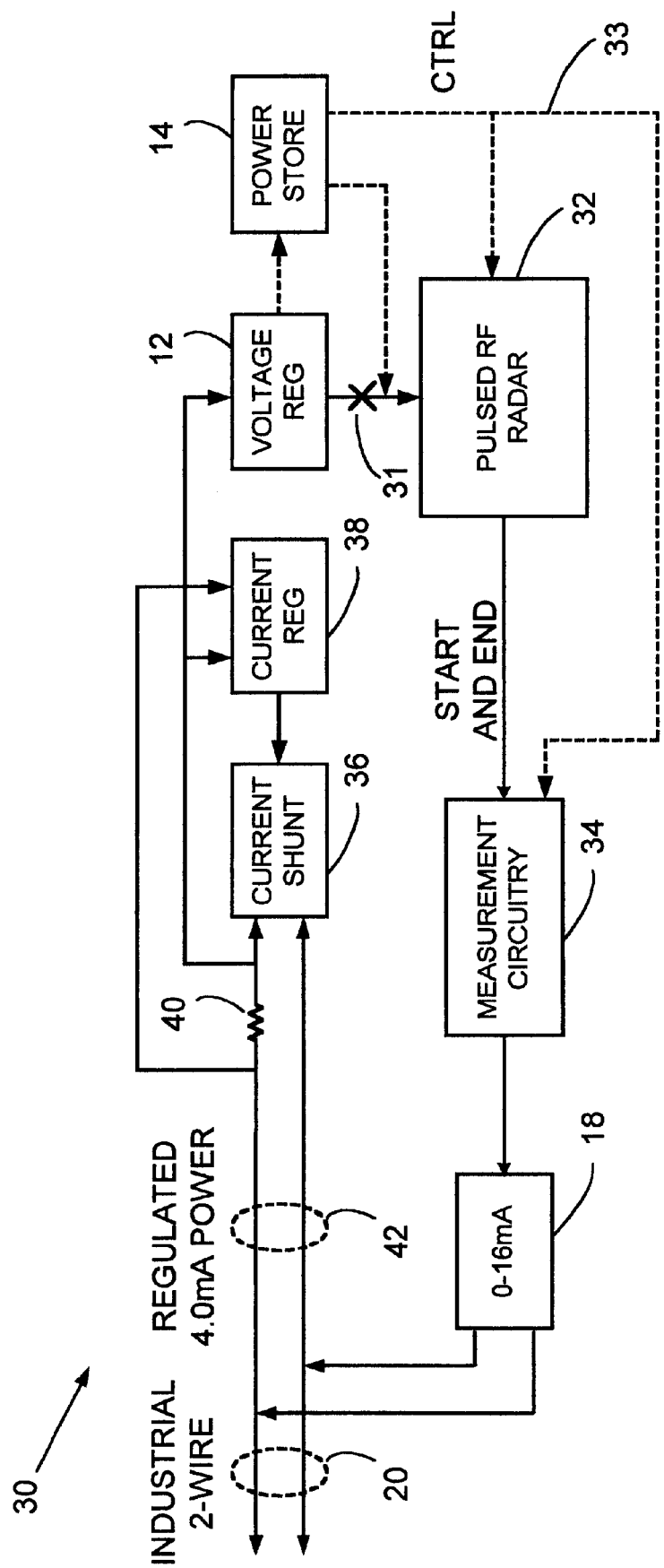
FIG. 2 is an overall block diagram of the loop-powered pulsed RF radar of the present invention.

FIG. 2 is an overall block diagram of a loop-powered radar 30 of the present invention. Two-wire loop 20 is coupled via wire pair 42 to a voltage regulator 12 to provide power to pulsed RF radar 32. The total current drawn by voltage regulator 12 must be less than 4 mA with a 4–20 mA loop (for a 4–20 mA standard, or 10 mA for a 10–50 mA standard). Accordingly, radar 32 and regulator 12 are designed to draw, for example, 3.0+/−0.5 mA and current shunt 36 connected to wire pair 42 draws the remaining 0.5−/+0.5 mA to make up exactly 4.0 mA. Current sense resistor 40 in wire pair 42 is coupled current regulator 38 which is also connected to shunt 36 to maintain an exact 4.0 mA by controlling the current flow in shunt 36. Thus, the accuracy of the 0–16 mA signaling current is not degraded by fluctuations in the current drawn by regulator 12 and radar 32. The voltage and current regulators are comprised of off-the shelf op amps and regulators, and current shunt 36 may be a FET or a bipolar transistor. A bridge rectifier may be added in series with line pair 20 to rectify wiring polarity reversals on line 20.

The power drawn by radar 32 is held to less than 4 mA by at least one of the following techniques: (1) a DC-DC power converter is built into regulator 12 to boost the available current from line 20 while regulating down the voltage, (2) low power integrated circuits are used, such as micropower op amps, (3) high speed CMOS logic is operated at reduced voltage, such as 3.0V, (4) the radar PRF is reduced to 4 MHz or lower, and (5) a low component-count single RF transistor homodyne radar of the present invention is used. Alternatively, a power store element 14 may be used to provide high peak power at a low duty cycle to radar 32 (the dashed lines connected to power store element 14 are operative and "X" 31 indicates the severance of the direct connection from regulator 12). Therefore, radar 32 can be of a high power design and operated with a low power-ON to power-OFF ratio to achieve low average power. A high power design for radar 32 permits the use of standard power integrated circuits, such as op amps, which cost less than their low power counterparts, and a high power design leads to reduced impedances throughout the system for greater resistance to the effects of moisture. Power store element 14 contains both a power storage means, such as a capacitor, and a duty-cycled output switch. Control line 33 coordinates the power ON-OFF cycles with functions within radar 32, such as its range sweep, and with measurement circuitry 34 functions, such as a data hold function. The output of radar 32 is connected to measurement circuitry 34, which determines range from START and END signals from radar 32. Measurement circuitry 34 provides its output to a 0–16 mA proportional current source 18, which is connected to two-wire loop 20.

Figure 3:
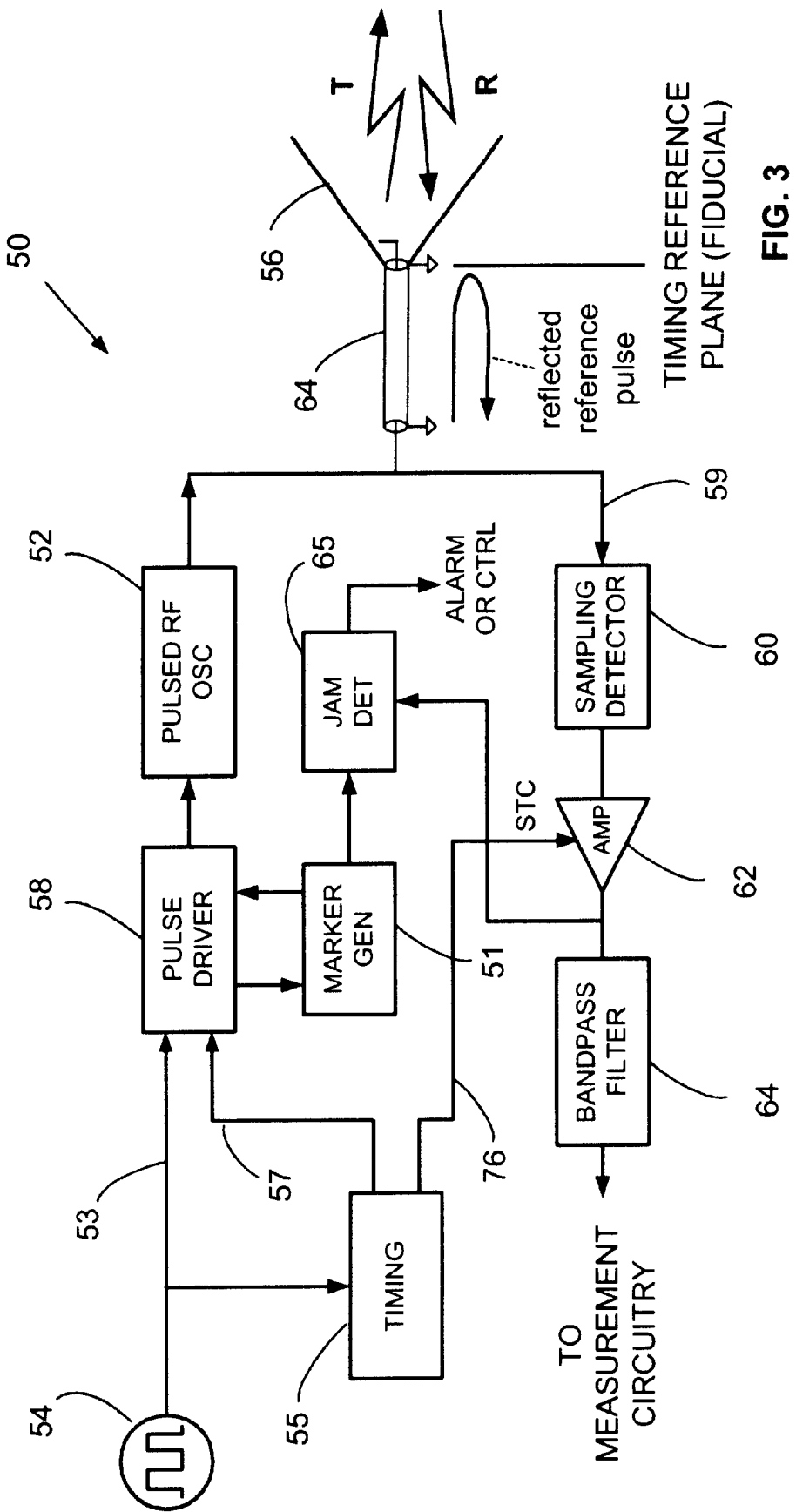
FIG. 3 is a block diagram of a single-antenna short-pulse microwave radar transceiver of the present invention.

FIG. 3 is a block diagram of a homodyne transmitter-receiver 50 of the present invention. An RF oscillator 52 receives clock pulses on line 53 from PRF oscillator 54 via pulse driver 58 and produces RF burst pulses (transmit pulses T) at the transmit antenna 56. Antenna 56 is connected to pulsed RF oscillator 52 through a transmission line 64. PRF oscillator 54 typically produces a 1–10 MHz squarewave that is passed through pulse driver 58 to form~1 ns wide pulses with rise and fall times on the order of 100 ps. Thus, the drive pulses are PRF oscillator pulses with very fast rise and fall times. Therefore, the PRF oscillator 54 and pulse driver 58 may together be viewed as a clock signal generator. These short pulses bias-on the RF oscillator 52, which is designed to start and stop oscillating very rapidly as a function of applied bias. The oscillations of the T pulses are phase coherent with the drive pulses, i.e., the phase of the RF sinusoids relative to the drive pulse remains constant, i.e., coherent, each time the oscillator is started—there is no significant clock-to-RF jitter. However, as will be discussed below with reference to the marker generator 51, separate marker pulses M may have a random phase relative to the clock.

A high degree of phase coherence for the T pulse can only be obtained with a very fast risetime drive pulse that shock excites the oscillator into oscillation. Accordingly, the pulse driver of the present invention has transition times of about 100 ps to ensure coherent oscillator startup. RF oscillator 52 typically operates at a fundamental frequency of 5.8 or 10.5 GHz, i.e., the unlicensed ISM bands. The transmitted pulsed RF bursts (T) are typically 5–30 sinewave cycles long and have a spectral main lobe that does not fall in a restricted band. This is in contrast to impulse or damped wave transmissions, which generally consist of a single Gaussian impulse or less than 1 cycle of RF, and have an associated spectrum spanning many restricted bands.

A receive (RX) clock signal is generated from PRF oscillator 54 pulses by timing circuit 55 and coupled on line 57 to pulse driver 58 to form~1 ns wide pulses with rise and fall times below 100 ps. These short pulses bias-on the RF oscillator 52 in a similar fashion to the drive pulses triggered by the TX clock signal to form~1 ns wide gate pulses G. The G pulses gate sampling detector 60 via path 59. Antenna 56 is connected through transmission line 64 to path 59 to sampling detector 60. Sampling detector 60 develops a detected signal, representing the coherent integration of multiple gatings, which is amplified by a low frequency amplifier 62 and filtered in bandpass filter 64 to produce a baseband video signal that is coupled to range measurement circuitry. Sampling detector 60 samples reflected signals from antenna 56 itself, and from echoes (R) of the T pulse arriving back at antenna 56.

The RX clock signal on line 57 is swept in time relative to the TX clock signal on line 53. A swept delay RX clock can be realized by the timing control element 55 (acting as a delay element with controlled delay). A means to accomplish precision swept timing has been described in U.S. Pat. No. 6,055,287, "Phase-Comparator-Less Delay Locked Loop," to McEwan, 2000, which exhibits 0.01% linearity across a 10-meter measurement range.

Alternatively, swept timing can be realized by operating an RX clock signal on line 57 at a slightly lower, or offset, frequency than the TX clock signal on line 53. Typically, the TX clock signal is generated by a first quartz crystal oscillator in the form of PRF oscillator 54, and the RX clock signal is generated by a second quartz crystal oscillator in timing element 55 that is phase locked to a typical offset of 100 Hz from the TX clock signal, such that the phase of the RX clock signal slips one full pulse repetition interval (PRI) every 10 ms. In this case, timing element 55 performs a phase-lock function between the TX and RX clock signals as more fully described in U.S. patent application Ser. No. 09/282,947, "Self Locking Dual frequency Clock System," and U.S. Pat. No. 6,072,427, "Precision Radar Timebase Using Harmonically Related Offset Oscillators," 2000, both to McEwan.

With either type of swept timing, an equivalent time (ET) replica of the transmitted RF signal radiated from antenna 56, and received back by the same antenna, appears at the output of sampling detector 60. The ET replica resembles the RF signal, except it occurs on a slow time scale such as 10 ms. In the typical case where the RF oscillator gate pulse G contains more than one RF cycle, the ET output is broadened somewhat by the convolution of the RF oscillator transmit pulse T and the RF oscillator gate pulse G.

The TX clock signal on line 53 can be modulated in frequency or phase, or with ON-OFF gating for various purposes known in the art, such as spreading the spectral lines generated by RF oscillator 52 to reduce interference to other spectrum users. The modulation may be coded to distinguish the desired received signal from that of others. Techniques to accomplish this are described in U.S. patent application Ser. No. 09/416,835, Homodyne Swept-Range Radar," to McEwan and in U.S. patent application Ser. No. 09/641,115, "Spread Spectrum Radar Clock," to McEwan.

A marker generator 51 is triggered by pulses from the pulse driver 58 to form marker pulses M which are much wider than the T or G pulses and which are applied back to driver 58 to also operate RF oscillator 52. Due to the width of the M pulses, the radiated spectrum becomes relatively narrow, since the spectral main lobe width is related by 2/PW, where PW is the width of the emitted pulses. One purpose of the narrow marker pulse spectrum is to aid in identifying the RF carrier frequency and spectral width of the transmitted pulses and to potentially facilitate regulatory approval. Further details on the marker pulse are discussed in U.S. patent application Ser. No. 09/416,835, Homodyne Swept-Range Radar," to McEwan.

Another use for the marker pulse is to provide a mixer pulse to detect interference in conjunction with jam detector 65, which receives signals from marker generator 51 and amplifier 62. If the marker pulse is generated with phase incoherence relative to the G pulses, the integrated output of sampling detector 60 will average to zero output for the marker pulse itself, making it essentially invisible to normal radar operation. However, if interference is present, the mixed products of interfering RF and the marker pulses will generate increased random noise which can be threshold detected by jam detector 65. An alternative timing relation for the marker pulse is to time-lock it to gate pulse G so the output of sampling detector 60 will have zero frequency for the marker pulse, which can be rejected with a simple highpass filter. However, interference signals will produce random noise or beat frequencies by mixing with the marker pulse and then appearing at the sampling detector output. The interference signals will pass through the highpass filter to jam detector 65 for threshold detection and alarm signaling or control. The output of jam detector 65 will normally set a "jammed" alarm flag, or it may be used to control threshold detectors within the measurement circuitry to maintain a constant false alarm rate (CFAR).

Pulses from timing circuit 55 are also applied over line 76 to amplifier 62 for sensitivity time control (STC) as will be further discussed below.

Figure 4:
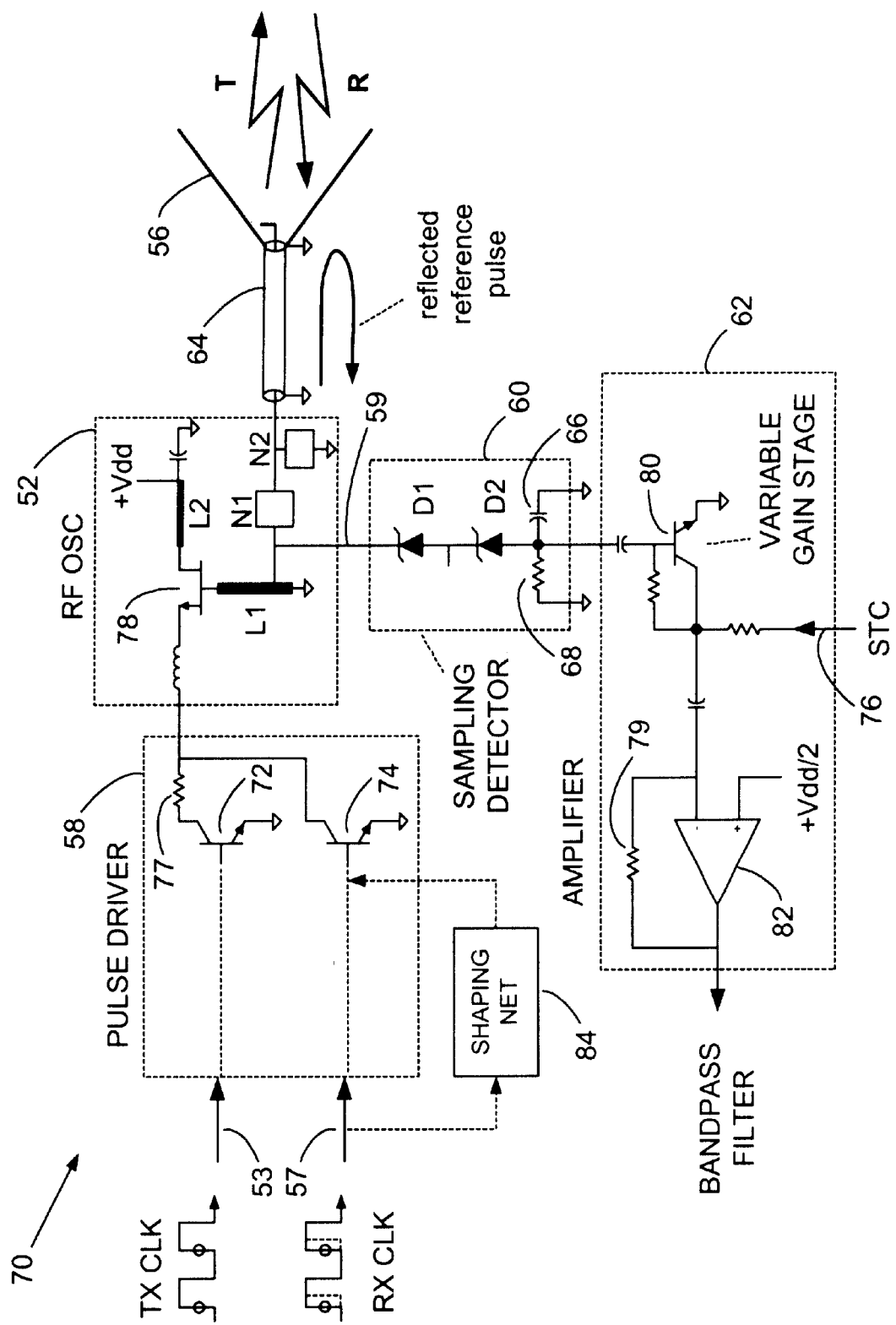
FIG. 4 is a schematic diagram of a single-antenna short-pulse microwave radar transceiver of the present invention.

A transmission line 64 (alternatively a waveguide) couples pulsed RF oscillator 52 and sampling detector 60 to antenna 56. Due to an essentially unavoidable microwave mismatch in impedance between line 64 and antenna 56, there will always be a reflected pulse at the line/antenna interface, which forms the time reference plane or fiducial for the measurement circuitry. Generally antenna 56 should have a return loss of about 20 dB, which will create a 10% reflection. A 10% reflection provides about the same amplitude reflected pulse from the antenna as from a very close reflecting object. This close matching of pulse amplitudes reduces dynamic range requirements for the detectors in the measurement circuitry. The measurement circuitry may employ constant fraction discriminators as described in U.S. Pat. No. 6,031,504, "Precision Short-Range Pulse-Echo Systems with Automatic Pulse Detectors," to McEwan, 2000, or time-of-peak detectors as described in U.S. patent application Ser. No. 09/282,962, "Material Level Sensor Having Wire Horn Launcher," to McEwan FIG. 4 is a detailed schematic diagram of a preferred embodiment 70 of the pulse driver 58, RF oscillator 52, antenna 56, sampling detector 60, and amplifier 62 (shown in FIG. 3) of the present invention. The TX clock signal is coupled on line 53 to switching transistor 72 (which partially forms pulse driver 58) to provide a transmit derive pulse with a fast leading edge. Line 53 is dashed to indicate that all the routine circuit details are not shown, such as pulse forming networks. These details are discussed in U.S. patent application Ser. No. 09/416,835, Homodyne Swept-Range Radar," to McEwan. Similarly, the receive (RX) clock signal is coupled on line 57 to switching transistor 74 in pulse driver 58 to provide a gate drive pulse with a fast leading edge. The timing of the receive clock signal is swept in phase relative to the transmit clock signal to provide a range scan. Each positive edge of the TX or the RX clock signals switch-ON transistors 72 and 74, respectively, for about 1-nanosecond. The outputs of transistors 72, 72 are input to RF oscillator 52.

Resistor 77 at the output of transistor 72 attenuates the pulse drive signal to RF oscillator 52 for the transmit pulse only, as it is preferable to have the transmit pulse current from transistor 72 slightly lower in amplitude than the gate pulse from transistor 74 to avoid peak detection of the transmit pulse rather than the reflected pulses by sampling detector 60.

The particular setting of the pulse width depends on the RF parameters required of the RF system. Very short RF pulses are needed for high spatial resolution, whereas wide pulses allow for a narrower bandpass filter 64 bandwidth and thus better signal to noise ratio. Also, the RF pulse width may be limited by regulatory constraints due to excessive bandwidth. The pulse widths generated by transistors 72, 74 need not be the same: wider pulse width settings for the gate pulse from transistor 74 result in lower sampling detector bandwidth and better signal to noise ratio at the expense of broadened detected pulses.

RF oscillator 52 is comprised of a GaAsFET 78, and microstrip resonators labeled L1 and L2 that are connected to the source and drain of GaAsFET 78. The microstrip resonators L1 and L2 are approximately one-quarter wavelength long at the fundamental frequency of oscillation. Transmission line 64 is coupled from a tap on L1 to antenna 56. One of the microstrip resonators can be adjusted in length or may have a short wire or metal tab (not shown in FIG. 4) attached to it to fine-tune the oscillator frequency. Alternatively, a metal screw can be brought close to one of the microstrips for fine-tuning. Networks N1 and N2 between L1 and line 64 provide matching to line 64, particularly in the reverse direction, for reflections returning on line 64, to prevent pulse rattles on line 64. Line 64 may also be a waveguide driven, for example, by an electric field probe coupled to network N1.

Series diodes D1, D2 of sampling detector 60 receive echoes from receive antenna 56 via lines 59 and 64 plus oscillations from RF oscillator 52 over line 59. The large RF pulses from oscillator 52 drive diodes D1, D2 into conduction and cause them to peak charge capacitor 66 connected from the output end of diodes D1, D2 to ground. Bias resistor 68 discharges capacitor 66, but slowly and over many repetitions of PRF oscillator 54. The input to sampling detector 60 is further comprised of an algebraic sum of echoes R and RF oscillator G pulses (as well as T pulses, which are generally excluded from the swept timing window). Since the G pulses are larger than the T pulses, only the G pulses and algebraically summed echoes exceed the conduction threshold of D1, D2. The average voltage across capacitor 66 has a steady DC component related to the G pulses, and a modulated component related to the sweeping in time of the G pulse combined with echo pulses. This modulated component is the desired equivalent time radar return signature. Sampler diodes D1, D2 are connected in series to cut the net terminal capacitance in half and more lightly load microstrip L1. Alternatively, only one diode may be used in place of D1, D2 with minor impairment.

Figure 6:
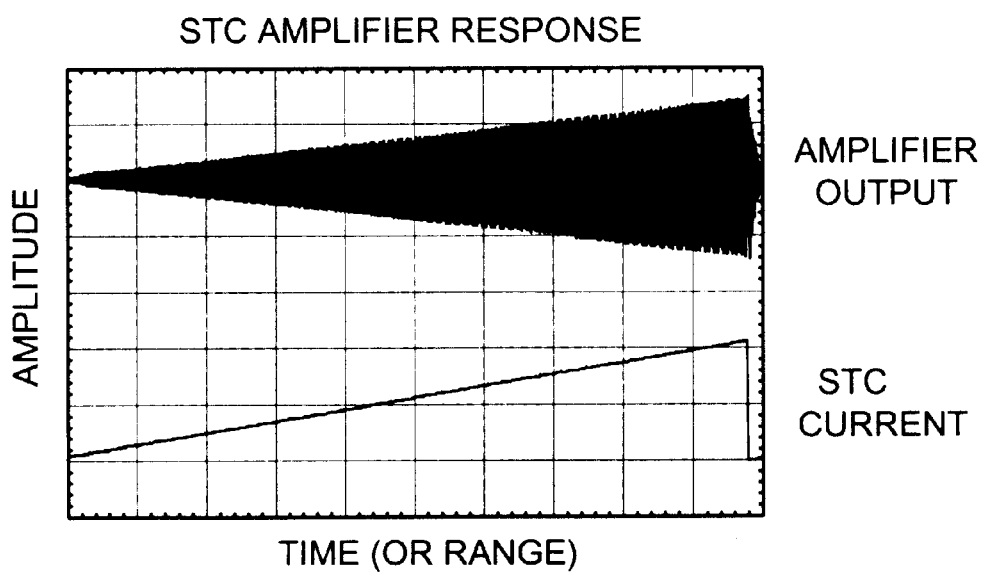
FIG. 6 plots the response of the new STC with a current ramp input.

Amplifier 62 amplitude-scales and impedance-buffers the detected signal from sampling detector 60. The signal is then passed to a bandpass filter 64 to limit noise and, in some cases, to provide Doppler filtering for velocity discrimination. In addition, the gain of amplifier 62 increases with increasing range of the G pulse, i.e., a sensitivity-time-control (STC) is implemented. The G pulse time relative to the T pulse is controlled by a voltage ramp (range ramp), or alternatively, a voltage ramp is generated to reflect the range gate timing. In either case, the range ramp is coupled to amplifier 62 as a current via line 76. The transconductance of transistor 80, which forms a variable gain stage in amplifier 62, is directly proportional to its emitter current, and accordingly the gain of amplifier 62 is proportional to the STC current as provided on line 76, since gain=$g_m R_1$, where $g_m$ is the transconductance of transistor 80 and $R_1$ is the load resistance 78 of transimpedance amplifier 82, which is an operational amplifier with a first input connected to transistor 80. Feedback resistor 79 is connected back from the output of operational amplifier 82 to the first input, and a bias voltage is applied to the other input. In the implementation shown in FIG. 4, amplifier gain 62 increases linearly with increasing range, as required of a radar working with very large targets, such as water in a large tank. For small targets, the gain of amplifier 62 must be increased with the square of range, and so two identical amplifier stages 62 can be cascaded to produce a square-law response. FIG. 6 plots the response of amplifier 62 with a linear ramp current on STC control line 76 and a constant amplitude 2.5 kHz sinewave input. The gain control of the amplifier spans a range of about 40 dB.

A marker pulse is produced by coupling the RX clock signal on line 57 through a shaping network 84 that comprises a pulse forming network or a pulse buffer and which switches transistor 74 ON well after any expected echoes have been received. This time slot is generally at the 50% point in the pulse interval of PRF oscillator 54. Further details related to marker pulse generation are described in U.S. patent application Ser. No. 09/416,835, Homodyne Swept-Range Radar," to McEwan.

GaAsFET transistor 78 is a NEC type NE42484A, silicon bipolar transistors 72, 74 are NEC type NE68533, diodes D1, D2 are HP type HSMS286C, transistor 80 is a 2N3904, and op amp 82 is a low power type LMV324.

Figure 5:
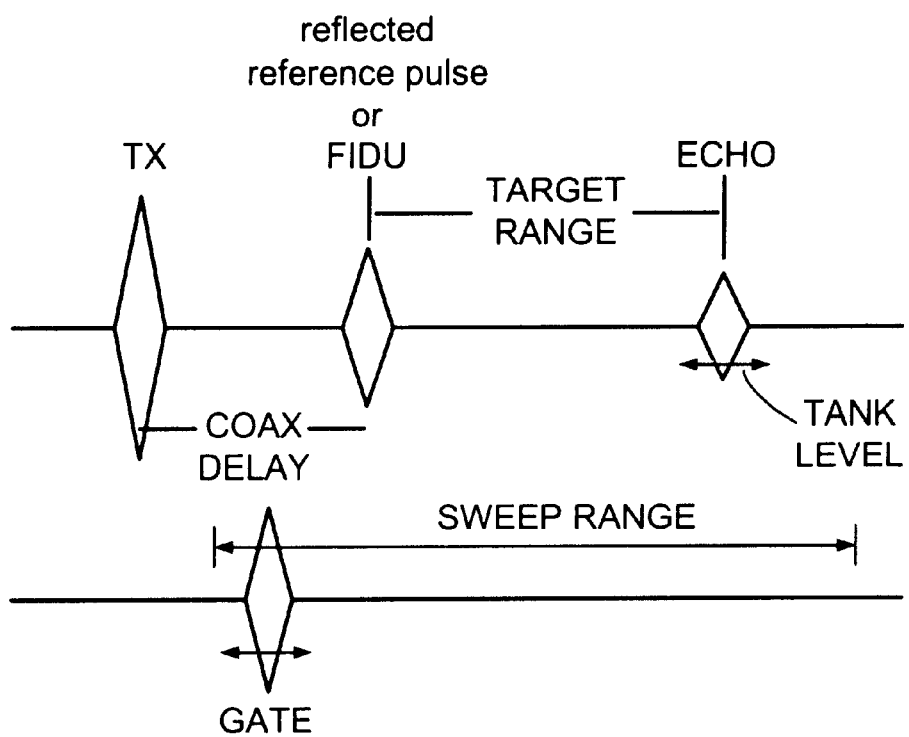
FIG. 5 is a timing diagram showing the relation between the transmit, fiducial and echo pulses.

FIG. 5 illustrates a timing diagram for the transceiver of 50 of FIG. 3. A large transmit (TX) RF pulse (envelope) is shown, followed by a fiducial (fidu) reflection from antenna 56 and an echo reflection from the target. There may be more than one echo reflection, but generally the measurement circuitry operates on the first large echo pulse, unless an inner layer in a tank is to be detected. The lower trace shows the gate pulse and the range over which it sweeps, which does not include the TX pulse. The TX pulse, and its direct main bang coupling to the sampling detector, is thereby gated out of the receive record. The sweeping of the gate pulse by timing element 55 causes the output of the sampling detector to nearly replicate the real-time pulses on a much expanded, equivalent-time scale and with an effective carrier frequency that is generally in the kilohertz range. The expanded time pulses are then easily processed by the measurement circuitry, which makes a range measurement based on the time difference between the fidu and the echo pulse (solely receiver output signals).

Although the invention has been described with reference to a 5.8 and 10.5 GHz system because of the high interest in these frequencies, the principles of the invention can be applied to other frequencies, e.g., 2.4 GHz and 38 GHz, and to other bandwidths, such as ultrawideband wherein oscillator 52 transmits extremely short duration sinusoidal pulses comprising as few as one RF cycle.

Changes and modifications in the specifically described embodiments can be carried out without departing from the scope of the invention, which is intended to be limited only by the scope of the appended claims.

What is claimed is:

1. A pulse-echo radar rangefinder coupleable to a two-wire process control loop for measuring range to a target, comprising:

an antenna, a transmission line, a pulsed RF transmitter-receiver coupled by the transmission line to the antenna for transmitting RF pulses to the antenna and receiving RF pulses from the antenna, the RF pulses from the antenna including echo pulses from a target and reflected reference pulses from the antenna itself, the echo pulses being produced by radiating RF pulses from the antenna to the target and receiving reflected pulses back from the target, measurement circuitry coupled to the transmitter-receiver for determining range solely from the reference pulses and echo pulses.

2. The system of claim 1 further comprising a two-wire process control loop coupled to the rangefinder for transmitting range information over the loop and providing a sole source of power to the rangefinder.

3. The system of claim 2 further comprising a current regulator coupled to the two-wire loop for stabilizing the power supply current drawn by the rangefinder.

4. The system of claim 2 further comprising a power store element for storing power and providing low duty cycle, high peak power to the rangefinder.

5. The system of claim 1 wherein the pulsed RF transmitter-receiver is a homodyne transmitter-receiver.

6. The system of claim 5 wherein the pulsed RF transmitter-receiver is a fundamental frequency homodyne transmitter-receiver.

7. A pulse-echo radar apparatus, comprising:

a pulsed RF transmitter-receiver, an antenna for radiating pulses to a target and receiving reflected echo pulses back from the target, a transmission line or waveguide coupled between the transmitter-receiver and the antenna, range measurement circuitry responsive to the time-of-flight difference in reflections from the antenna and reflections from the target.

8. The apparatus of claim 7 further comprising a two-wire process control loop coupled to the pulsed RF transmitter-receiver and to the range measurement circuitry.

9. The apparatus of claim 8 further comprising a current regulator coupled to the two-wire loop.

10. The apparatus of claim 9 further comprising a power store element coupled to the two-wire loop.

11. The apparatus of claim 7 wherein the pulsed RF transmitter-receiver is a homodyne pulsed RF transmitter-receiver.

12. A method for measuring range to a target, comprising:

transmitting an RF pulse to an antenna via a transmission line or waveguide, creating a first reflection at the antenna, receiving the first reflection, radiating the RF pulse from the antenna to a target, receiving a second reflection from the target with the antenna, measuring target range from the first and second received reflections.

13. The method of claim 12 further comprising transmitting the RF pulse and receiving the first and second reflections with a homodyne transmitter-receiver.

14. The method of claim 12 further comprising receiving power solely from a low power current loop and signaling target range over the same current loop.

15. The method of claim 14 further comprising storing power from the low power current loop and operating a rangefinder, which transmits the RF pulse and receives the first and second reflections while drawing high peak power at low duty cycle from the stored power.

* * * * *